Feb. 19, 1924.
J. SZAFRANSKI
1,484,094
POTATO PEELING MACHINE
Filed July 6, 1923
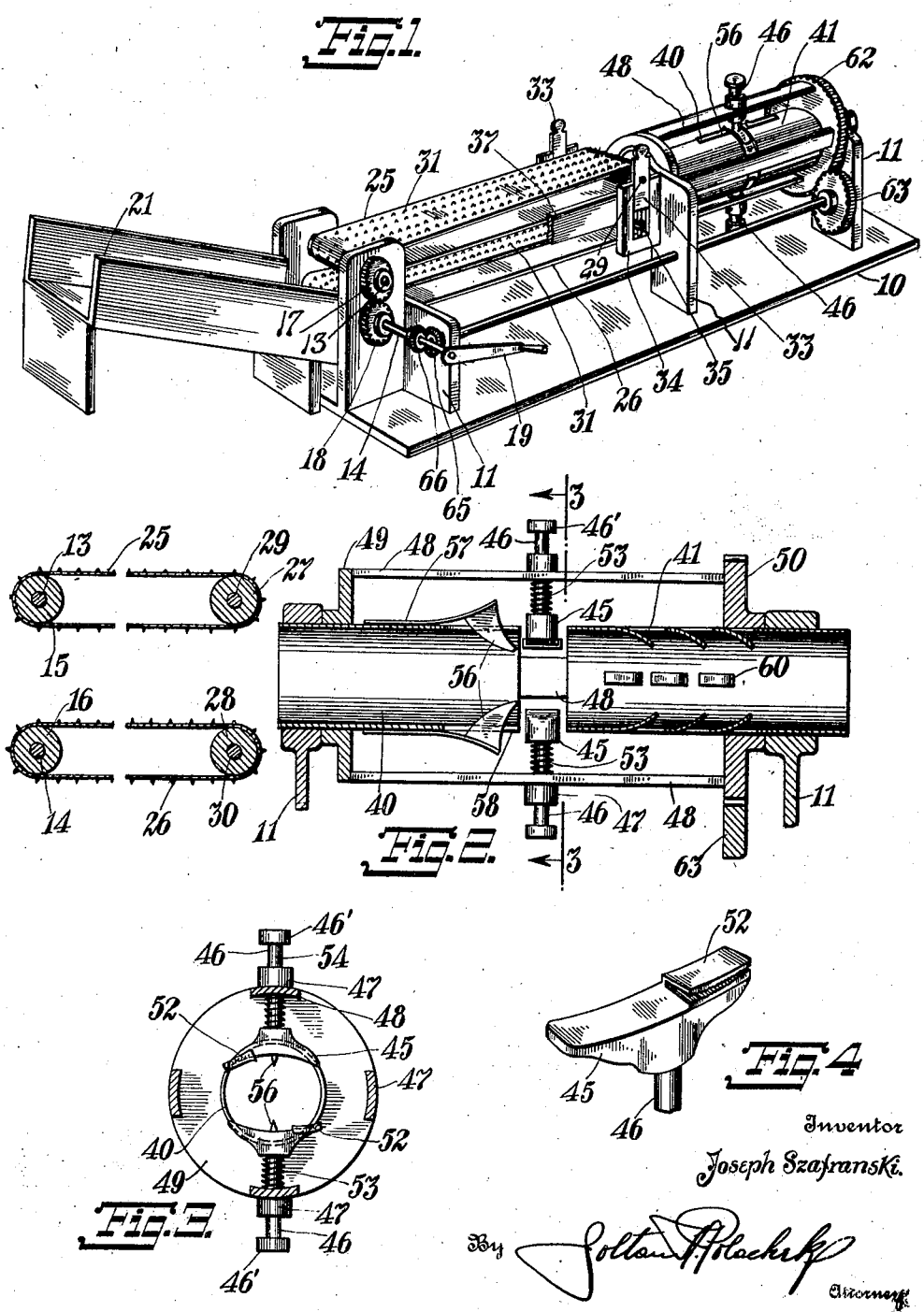

Patented Feb. 19, 1924.

1,484,094

UNITED STATES PATENT OFFICE.

JOSEPH SZAFRANSKI, OF DANIELSON, CONNECTICUT.

POTATO-PEELING MACHINE.

Application filed July 6, 1923. Serial No. 649,862.

*To all whom it may concern:*

Be it known that I, JOSEPH SZAFRANSKI, a citizen of the United States, residing at Danielson, in the county of Windham and State of Connecticut, have invented certain new and useful Improvements in Potato-Peeling Machines, of which the following is a specification.

This invention relates generally to a machine for peeling fruits and vegetables, being particularly intended for use in peeling potatoes, although as will be understood it is not limited to such use.

The invention has for an object the provision of a novel and simple machine of this sort in which the potatoes are fed to a rotary peeling implement, suitable devices being provided for keeping the potatoes in contact with the peeling implement and for preventing rotation of the former.

For further comprehension of the invention, and of the objects and advantages thereof, reference will be had to the following description and accompanying drawings, and to the appended claims in which the various novel features of the invention are more particularly set forth.

Fig. 1 of the drawings is a perspective view of my improved peeling machine.

Fig. 2 is a fragmentary central longitudinal vertical sectional view thereof.

Fig. 3 is a detail transverse sectional view taken on the line 3—3 of Fig. 2.

Fig. 4 is a detail perspective view of one of the peeling implements.

As here embodied my improved peeling machine comprises a frame consisting of a base 10 and a number of standards 11 which support the mechanism. A pair of these standards 11 are located adjacent one end of the base and serve to support shafts 13 and 14 carrying a pair of transversely extending vertically spaced rollers 15 and 16. The shafts 13, 14 have fixed thereto the gears 17 and 18 respectively. The shaft 14 may be the drive shaft of the machine and may have fixed thereon a crank handle 19 for purposes of rotation, or it may be driven by a suitable motor if desired. Leading into the space between the rollers 15, 16 is an inclined chute 21 which feeds the potatoes by gravity between the rollers.

Looped over these rollers are bands or aprons 25 and 26 which extend longitudinally of the machine and are looped also over a second pair of transversely extending and vertically spaced rollers 27 and 28 fixed on shafts 29 and 30 supported by others of the standards 11. These aprons have spikes 31 thereon which grip the potatoes to feed the latter forward. The top roller 27 of the last mentioned pair is preferably arranged for vertical adjustment and to this end its shaft 29 is journaled in blocks 33 vertically adjustable in guides such as 34 in the said standards, these blocks being adapted to be adjusted by the screws 35. Confining bars 37 extend along beside the aprons to prevent sidewise displacement of the potatoes as they are carried along.

The potatoes are fed from between the rollers 27, 28 into a short cylindrical member 40 which extends along the machine and is suitably supported by one of the standards 11, this member 40 being axially alined with a like member 41 supported by another of the standards 11, a short space being left between the two members 40 and 41 to receive the cutting implement, or implements, two being here shown. Each cutting implement is in the form of a segmental bar or yoke 45 which is fixed on the inner end of a rod 46 extending radially of the members 40, 41 and guided in bosses 47 formed on longitudinal bars 48 fixed at opposite ends to disks 49, 50 freely mounted on the said members. The cutter elements 45 have knives 52 fixed thereon and spaced the required distance from the inner face thereof to cut the desired thickness of peeling. The cutting implements are pressed radially inward by means of springs 53 coiled around the rods 46, heads 47 on the outer ends of the latter limiting the inward movement of the said implements. To prevent turning of these implements, the rods 46 may have keys 54 on the sides thereof which engage in suitable grooves in the bosses 47.

In order to prevent the potatoes from turning or rotating with the cutter implements a series of fin-like members 56 are fixed to the free ends of flat springs 57 which are fixed on the member 40, these elements 56 projecting radially inward into the said member through longitudinal slots 58 in the latter and engaging the potatoes as they pass between the cutting elements and preventing rotation of the potatoes. By reason of their resilient mounting these elements will follow the contours of the potatoes, engaging the latter with just sufficient force to hold them.

In order to prevent the potatoes from being pushed forward by the cutting implements as the latter engage the rear portions of the potatoes a series of curved spring fingers 60 are mounted in the member 41 and resist the travel of the potatoes sufficiently to prevent the same from being shot forward by the pressure of the cutting implements on their rear portions.

To rotate the cutting implements a gear ring 62 is fixed to the disk 50 and is engaged by a gear 63 fixed on a longitudinal countershaft 64 whose opposite end has fixed thereto a bevel gear 65 meshing with a like gear 66 on the drive shaft 14.

It is believed that the manner of operation and use of my improved peeling machine will be readily understood from the above description, the potatoes traveling down the chute 21 by gravity and being caught between the belts 25 and 26 and fed forward to the cutting implement, the peeled potatoes being discharged from the end of the member 41.

Having thus described my invention, what I claim as new and desire to protect by Letters Patent of the United States is as follows:

1. A peeling machine comprising a pair of traveling belts, a pair of fixed alined tubular members adapted to receive the article to be peeled from the said belts, and a cutting implement arranged between the adjacent ends of the said tubular members.

2. A peeling machine comprising a pair of traveling belts, a pair of fixed alined tubular members adapted to receive the article to be peeled from the said belts, and a cutting implement arranged between the adjacent ends of the said tubular members, and means for rotating said cutting implement.

3. A peeling machine comprising a pair of traveling belts, a pair of fixed alined tubular members adapted to receive the article to be peeled from the said belts, a rotary cutting implement positioned between the adjacent ends of the said members, and resilient means pressing said cutting implement against the said article.

4. A peeling machine comprising a pair of traveling belts, a pair of fixed alined tubular members adapted to receive the article to be peeled from the said belts, a rotary cutting implement positioned between the adjacent ends of the said members, and resilient means pressing said cutting implement against the said article, and elements in one of said tubular members adapted to engage the said article to prevent rotation of the latter.

5. A peeling machine comprising a pair of traveling belts, a pair of fixed alined tubular members adapted to receive the article to be peeled from the said belts, a rotary cutting implement positioned between the adjacent ends of the said members, and resilient means pressing said cutting implement against the said article, and elements in one of said tubular members adapted to engage the said article to prevent rotation of the latter, said elements comprising fins projecting into said tube, and springs on which said fins are mounted.

6. A peeling machine comprising a pair of traveling belts, a pair of fixed alined tubular members adapted to receive the article to be peeled from the said belts, a rotary cutting implement positioned between the adjacent ends of the said members, and resilient means pressing said cutting implement against the said article, and elements in one of said tubular members adapted to engage the said article to prevent rotation of the latter, and elements in the other of said tubes adapted to resist forward movement of the said article.

7. A peeling machine comprising a pair of traveling belts, a pair of fixed alined tubular members adapted to receive the article to be peeled from the said belts, a rotary cutting implement positioned between the adjacent ends of the said members, and resilient means pressing said cutting implement against the said article, and elements in one of said tubular members adapted to engage the said article to prevent rotation of the latter, and elements in the other of said tubes adapted to resist forward movement of the said article, said last named elements comprising curved spring fingers.

In testimony whereof I have affixed my signature.

JOSEPH SZAFRANSKI.